Patented June 9, 1936

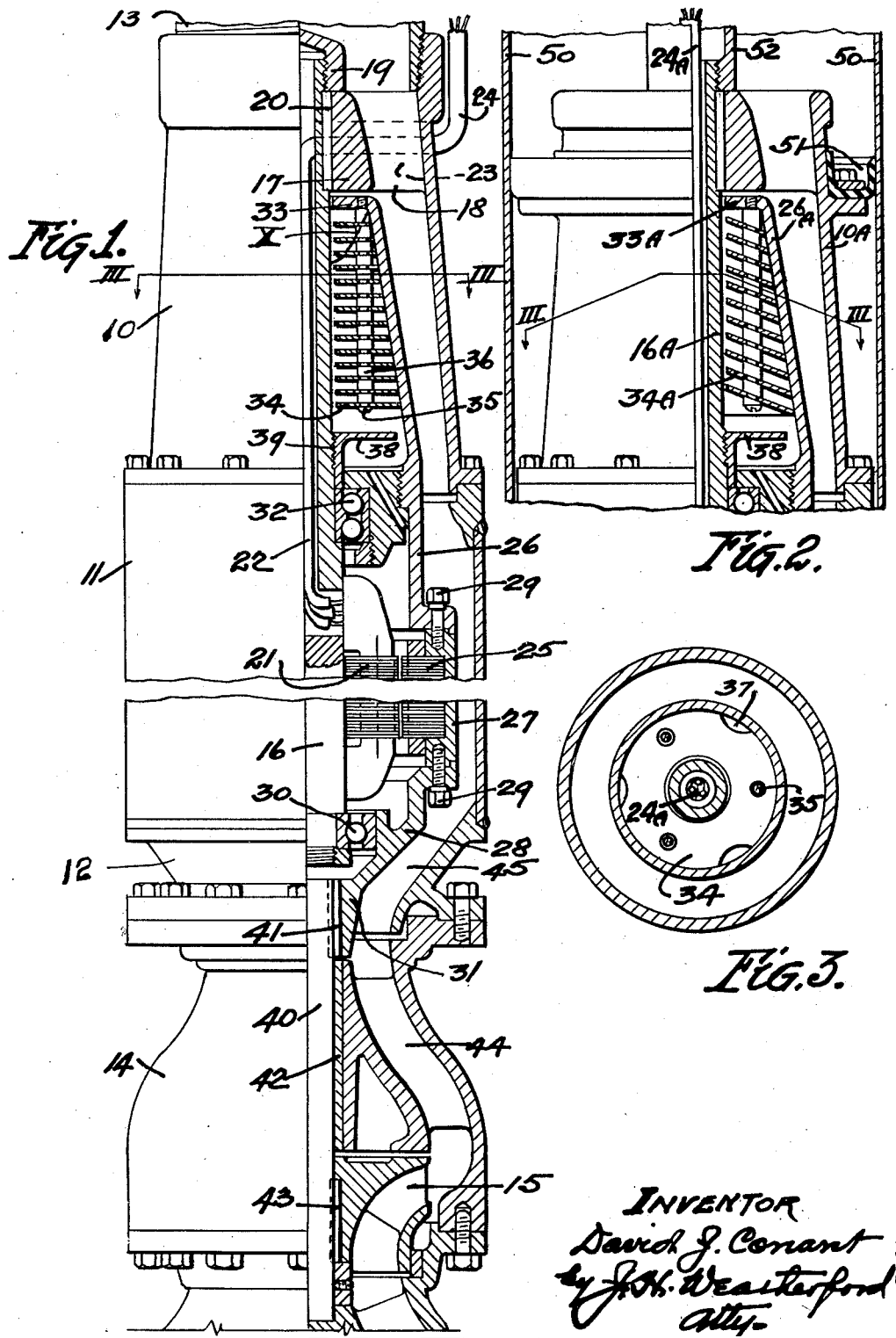

2,043,283

UNITED STATES PATENT OFFICE 2,043,283

SUBMERGIBLE MOTOR

David J. Conant, Memphis, Tenn.

Application May 7, 1934, Serial No. 724,377

18 Claims. (Cl. 172—36)

This invention relates to motors which are intended to be submerged and operated during submersion, and to motors of this kind which have a casing adapted, and intended, to be filled with a di-electric liquid. It particularly relates to motors which are filled with an oil heavier than water.

It is desirable under many conditions to operate an electric motor completely submerged in a fluid which would be injurious to the working parts of the motor should such submerging fluid effect entry thereinto.

Heretofore the motor has been protected by compressed air, and mechanical sealing devices. Also, it has been found convenient to fill the motor casing with oil of high di-electric strength, but when the surrounding fluid is water, the oil and water form quite stable mechanical emulsions when agitated together, as occurs in sleeve bearings or in the clearance between stationary stand pipes and rotating shafts, such emulsions being injurious to both the motor and its bearings. It is to this latter type of motor and the prevention of such agitation and formation of such emulsions that the present invention relates.

The present invention is particularly directed to an apparatus in which the motor shaft is stationary and carries the stator, with the rotor surrounding the stator, and in which an extension of the rotor casing forms a centrifugal separator.

The principal objects of this invention are:

To provide a motor which will operate in a body of insulating and lubricating oil;

To provide a simple fluid seal having direct contact between the internal and external motor fluids;

To provide means including a centrifugal separator for preventing entry of the surrounding liquid into the motor chamber;

To provide means in such centrifugal separator for minimizing surging of the oil as the motor speeds up and during operation thereof establishing a steady surface of revolution between the exterior liquid and the heavier di-electric fluid; and To provide in a motor filled with an insulating and lubricating fluid heavier than the submerging fluid, means for preventing entry of such submerging liquid into the motor, by direct separation through centrifugal force.

The means by which the foregoing and other objects are accomplished, and the manner in which they are accomplished, will readily be understood from the following specification on reference to the accompanying drawing, in which,—

Fig. 1 is a vertical elevation, half in section, showing a submergible motor, the center portion longitudinally, being largely omitted, and indicating a pump impeller or impellers, below the motor and driven thereby. It also shows the motor casing extended upward to form a centrifugal separator preventing ingress of the submerging fluid to the motor.

Fig. 2 is a similar sectional elevation of the upper or separator portion of the device, showing modifications in the details thereof.

Fig. 3 is a sectional plan taken as on the line III—III of Fig. 2, and Fig. 1.

Referring now to the drawing in which the various parts are indicated by numerals, 10, 11 and 12 are respectively the upper, center and lower portions of a housing forming a portion of the present assembly. The upper portion 10 of the housing is supported by a discharge pipe 13 of suitable capacity, which discharge pipe extends to the surface of the well and is there suitably supported in usual manner. The various sections of the housings are secured together by bolting or welding, or in any usual or desired manner. Secured to and depending from the lower section 12 of the housing is a pump section 14, which includes an impeller 15 driven by the motor.

The motor is disposed within the housing 10—11—12 and includes a non-rotating shaft 16 which is suspended from a hub 17, this hub being carried in the housing 10 as by ribs 18. The shaft 16 preferably passes through the hub 17 and is secured thereto and supported by a cap 19, threadedly engaging the upper end of the shaft. 20 is a key preventing rotation of the shaft in the hub. Mounted on the shaft is the stator 21 which may be a stationary polar-wound three-phase transformer. The upper end of the shaft is hollow and insulated leads 22 are brought in through this hollow shaft to the stator. These leads may extend outward through a suitable opening 23 in one of the ribs 18 and thence be led upward through an insulated cable 24 or as separate leads to a suitable source of current above the ground.

25 is a laminated rotor of comparatively large diameter with cast-in short-circuited windings. The rotor is enclosed in, and rotates with, an annular casing preferably divided for construction purposes, into an upper portion 26, a center portion 27, and a lower portion 28, which sections may be secured together as by bolts 29. The center section is preferably cylindrical and substantially coextensive with the rotor which is fixedly mounted therein. The lower portion 28 is journaled as by a bearing 30, about the shaft 16 which terminates immediately below such bearing. The casing-portion 28 is extended below such bearings and shaft end to form a hub 31. The upper portion of the casing 26 is journaled on the shaft 16 as by a bearing 32 and is extended above such bearing preferably coning inward as it extends upward, and carries at its upper end an inwardly extending flange 33 which is bored out to a loose running fit with the shaft.

Disposed in the conical portion of the casing are a plurality of parallel baffle plates 34 each of which closely fits the interior of the casing and is bored out to a loose running fit with the shaft. These baffle plates may be held in place by bolts 35, threaded into the flange 33, the spacing of the plates being maintained as by sleeves 36 disposed around the bolts and between the plates. Preferably as shown in Fig. 3, three of these bolts are used. Each of the annular plates has around its periphery indentations or notches 37 (Fig. 3), which permit passage of fluid along the interior casing wall from the space between one pair of plates to the other similar spaces. Spaced below the lower of the plates 34 is an annular disk 38 which is secured to the shaft 16, as by threading. The outer edge of this disk is spaced away from the casing to leave an annular space therebetween. Preferably the disk 38 has a hub portion 39 which threadedly engages the shaft 16 and which extends along the shaft to hold the shaft portion of the bearing 32 in place.

The hub 31 of the casing section 28 is bored out to receive a shaft 40 which shaft is tightly fitted and sealed to the interior of the hub 31, and is caused to rotate therewith as by a key 41. The shaft 40 extends downward through the pump assembly 14, being journaled in a sleeve 42 therein and carries at its lower end the pump impeller 15 which is securely mounted on and is keyed to the shaft as by a key 43. The shaft 40 may terminate adjacent the bottom of the impeller 15, or if an additional pump section or sections are to be carried, may extend downward thereto. 44 are passageways through the pump section leading to the annular passageway 45 between the motor casing and the housing.

In Fig. 2 a modification is shown in which the discharge pipe 13 is dispensed with and pump discharge is directly into the well casing 50. Housing section 10A is sealed to the well casing 50 in any desired manner, as for instance, by a U leather 51. In such case the housing motor assembly and other associated parts are supported by a central tube 52, which extends to the surface of the ground, and the power cable 24A is preferably extended upward to the surface within such tube.

In Fig. 2 also, coned disks 34A are shown, which permit such lighter surrounding fluid as may enter to be pushed inward and upward along the underside of the disks, thereby effecting an easier clearance, than in the case of the disks 34 previously shown. It will be understood however that the type of disks originally shown, may be used in this modification, or that the modified disks may be used in the original form of the device.

For use, the motor casing is completely filled with an oil of greater specific gravity than the submerging fluid, this oil filling all the motor spaces from the top of the hub 31 to the bottom of the flange 33. So filled, the assembly is ready for use and is lowered to where it may be used, the motor casing being submerged in the fluid which is to be pumped but the oil being heavier than the surrounding fluid, is not displaced thereby. When current is turned on to the motor, the casing 26, 27, 28 is rotated and through the hub 31 and shaft 40, rotates the pump impeller or other connected mechanism.

As the motor speeds up, the oil is thrown centrifugally outward by movement of the casing, so that there is a tendency of a limited amount of the surrounding fluid to enter between the flange 33 and the stationary shaft 16, and to move downward therealong. Such movement however tends to establish the entering fluid as a paraboloid of revolution with a junction surface as indicated by the line X between such fluid and the oil. This paraboloid adjusts itself in shape to conform between the balance of the speed of revolution and the differences in specific gravity of the fluid and the oil. Such balance is found to quickly adjust itself for any particular speed of rotation and thereafter to be remarkably steady and free from pulsations or variations. However during speeding up and slowing down of the motor, there is a tendency on the part of both the oil and the fluid, particularly the fluid, to surge and become agitated. It is found that this surging is controlled by the introduction of the baffles 34 within the casing.

In the pumping unit shown, the discharge from the pump impeller 15 is upward through the passageways 44, 45, the revolving motor casing, and stationary housing forming the latter passageway.

It will be understood that the motor which is here shown as driving a pump may be used for driving submerged rotary mechanisms of other types as well.

What I claim is:

1. In a submergible motor, having a rotary casing closed at the lower end and housing the motor parts, and a stationary shaft, an integral portion of said casing extending upward therefrom and having an annular inwardly turned flange at its upper end, said shaft protruding above said flange, said extension carrying a group of spaced, inwardly extending annular disks, and said shaft an outwardly extending disk disposed above said motor parts and below said annular disks.

2. In a submergible motor having a rotary casing closed at the lower end, housing the motor parts, and a stationary shaft, an extension, of said casing rigidly secured and sealed thereto, extending upward therefrom, said extension having an annular inwardly turned flange at its upper end, said shaft protruding above said flange, said extension carrying a group of spaced, inwardly extending annular disks, and said shaft an outwardly extending disk disposed above said motor parts and below said group of annular disks, said annular disks being peripherally apertured to provide passageways for liquid along the interior of said casing extension.

3. In a submergible motor having a rotary casing closed at the lower end, housing the motor parts, and a stationary shaft, an extension, of said casing rigidly secured and sealed thereto, extending upward therefrom, said extension having an annular inwardly turned flange at its upper end, said shaft protruding above said flange, said extension carrying a group of spaced, inwardly extending annular disks, and said shaft carrying stationary baffling means extending outward therefrom, said shaft carried means being disposed below said group of annular disks and above said motor parts and spaced from both thereof.

4. In a submergible motor having a rotary casing closed at the lower end, housing the motor parts, and a stationary shaft, an extension of said casing rigidly secured and sealed thereto, extending upward therefrom, said extension having an annular inwardly turned flange at its upper end, said shaft protruding above said flange, said extension carrying a group of spaced, inwardly extending annular disks, and said shaft carrying stationary baffling means extending outward therefrom, said baffling means being disposed below said group of annular disks and above said motor parts and spaced from both thereof, said annular disks being peripherally apertured to provide passageways for liquid along the interior of said casing extension.

5. In a submergible motor having a rotary casing closed at the lower end, housing the motor parts, and a stationary shaft, an extension of said casing, rigidly secured and sealed thereto, extending upward therefrom, said extension having an annular inwardly turned flange at its upper end, said shaft protruding above said flange, said extension carrying a group of spaced, inwardly extending, and upwardly inclined, annular disks, and said shaft an outwardly extending disk disposed above said motor parts and below said group of annular disks.

6. In a submergible motor having a rotary casing closed at the lower end, housing the motor parts, and a stationary shaft, an extension of said casing, rigidly secured and sealed thereto, extending upward therefrom, said extension having an annular inwardly turned flange at its upper end, said shaft protruding above said flange, said extension carrying a group of spaced, inwardly extending, and upwardly inclined annular disks, and stationary baffling means extending outward from said shaft, said stationary means being disposed solely below said group of annular disks and above said motor parts.

7. In a submergible motor having a rotary casing closed at the lower end, housing the motor parts, and a stationary shaft, an extension of said casing, rigidly secured and sealed thereto, extending upward therefrom, said extension having an annular inwardly turned flange at its upper end, said shaft protruding above said flange, said extension carrying a group of spaced, inwardly extending, and upwardly inclined, annular disks, and said shaft an outwardly extending disk disposed above said motor parts and below said group of annular disks, said annular disks being apertured to provide passageways for liquid adjacent the interior of said casing extension.

8. In a submergible motor, having a rotary casing closed at the lower end and housing the motor parts, and a stationary shaft, an integral portion of said casing extending upward therefrom and having an annular inwardly turned flange at its upper end, said shaft protruding above said flange, said extension carrying a group of spaced, inwardly extending annular disks.

9. In a submergible motor having a rotary casing closed at the lower end housing the motor parts, and a stationary shaft, an extension, of said casing rigidly secured and sealed thereto, extending upward therefrom, said extension having an annular inwardly turned flange at its upper end, said shaft protruding above said flange, said extension carrying a group of spaced, inwardly extending annular disks, said annular disks being peripherally apertured to provide passageways for liquid along the interior of said casing extension.

10. In a submergible motor having a rotary casing closed at the lower end, housing the motor parts, and a stationary shaft, an extension of said casing, rigidly secured and sealed thereto, extending upward therefrom, said extension having an annular inwardly turned flange at its upper end, said shaft protruding above said flange, said extension carrying a group of spaced, inwardly extending, and upwardly inclined, annular disks.

11. In combination, a submergible electric motor, having a stationary axle shaft, a shell, closed at the bottom housing said motor and forming a reservoir for a protecting fluid, and an auxiliary protecting-fluid reservoir in communcation with said first named reservoir, said shaft extending through and above the said auxiliary reservoir and forming therewith an annular chamber and a disk within said auxiliary reservoir, spaced above said motor, and secured to said shaft said disk extending outward toward the wall of said auxiliary reservoir, whereby to maintain the protecting fluid in said reservoir below or radially outside of the submerging fluid.

12. In a submergible motor including a stationary shaft and a rotatable casing closed at its lower end, and disposed around said shaft and the motor parts, an extension of said casing rigidly secured and sealed thereto, extending above said motor parts, and inwardly turned at its upper end toward said shaft, said extension forming a centrifugal chamber in direct communication with said shaft, said shaft extending through and beyond said extension, said casing and extension enclosing inter-communicating chamber portions adapted to be jointly filled with a dielectric fluid, and a disk secured to said shaft, above, and spaced from said motor parts, extending outward toward said extension-casing.

13. In a submergible motor, a stationary shaft, and a rotatable casing closed at its lower end, and disposed around said shaft and the motor parts, said casing having an extension above said motor parts, rigidly secured and sealed to said casing, converging upward along said shaft and inwardly turned at its upper end toward said shaft, said extension forming a centrifugal chamber in direct communication with said shaft, said shaft extending through and beyond said casing extension, said casing and extension enclosing inter-communicating chamber portions adapted to be filled with a dielectric fluid.

14. In a submergible motor including a stationary shaft, and a rotatable casing closed at its lower end, and disposed around said shaft and the motor parts, said casing having an extension above said motor parts, rigidly secured and sealed to said casing, converging upward along said shaft and inwardly turned at its upper end toward said shaft, said extension enclosing a centrifugal chamber in direct lateral communication with said shaft, said shaft extending through and beyond said chamber, said casing and extension enclosing intercommunicating chamber portions adapted to be filled with a dielectric fluid, and a disk secured to said shaft, adjacent the lower end of said centrifugal chamber, extending outward from said shaft.

15. In a submergible motor, a stationary shaft, and a rotatable casing closed at its lower end, and disposed around said shaft and the motor parts, said casing having an extension above said motor parts, rigidly secured and sealed to said casing, converging upward along and concentric with said shaft, said shaft extending through and beyond said extension, said extension forming with said shaft an annular centrifugal chamber having inner and outer walls in direct lateral communication, means having a communicating way therethrough dividing said casing from said extension to form intercommunicating chamber portions adapted to be filled with a dielectric fluid.

16. In a submergible motor, a stationary shaft, and a rotatable casing closed at its lower end, and disposed around said shaft and the motor parts, said casing having an extension above said motor parts, rigidly secured and sealed to said casing, extending upward along and concentric with said shaft, said shaft extending through and beyond said extension, and said extension forming a centrifugal chamber in direct communication with said shaft, and means, having a communicating way therethrough, dividing said casing from said extension to form intercommunicating chambers adapted to be jointly filled with a dielectric fluid, and means within said centrifugal chamber to dampen surging along the wall of said chamber.

17. In a submergible motor, a stationary shaft, and a rotatable casing closed at its lower end, and disposed around said shaft and the motor parts, said casing having an extension above said motor parts, rigidly secured and sealed to said casing, converging upward along and concentric with said shaft, said shaft extending through and beyond said extension, said extension forming a centrifugal chamber in direct communication with said shaft, means having a communicating way therethrough dividing said casing from said extension to form inter-communicating chamber portions adapted to be filled with a dielectric fluid, and means within said centrifugal chamber to dampen surging along the wall of said chamber.

18. In a submergible motor, a stationary shaft, and a rotatable casing closed at its lower end, and disposed around said shaft and the motor parts, said casing having an extension above said motor parts, rigidly secured and sealed to said casing, extending upward along and concentric with said shaft and inwardly turned at its upper end toward said shaft, said shaft extending through and beyond said extension, said extension forming a centrifugal chamber in direct communication with said shaft, and means having a communicating way therethrough dividing said casing from said extension to form inter-communicating chamber portions adapted to be filled with a dielectric fluid, and means within said centrifugal chamber to dampen surging along the wall of said chamber.

DAVID J. CONANT.